United States Patent
Park et al.

(10) Patent No.: US 8,260,354 B2
(45) Date of Patent: Sep. 4, 2012

(54) OPERATING DEVICE AND METHOD FOR UNIVERSAL IC CARD

(75) Inventors: Kum Rye Park, Suwon-si (KR); Sung Soo Park, Seoul (KR); Ju Beam Lee, Osan-si (KR); Jung In Lee, Suwon-si (KR); Rae Jin Uh, Seoul (KR); Kyu San Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 12/470,015

(22) Filed: May 21, 2009

(65) Prior Publication Data

US 2009/0291712 A1 Nov. 26, 2009

(30) Foreign Application Priority Data

May 21, 2008 (KR) .................. 10-2008-0047190

(51) Int. Cl.
*H04B 1/38* (2006.01)
(52) U.S. Cl. .................. 455/558; 455/556.1; 455/575.1; 235/380; 710/301
(58) Field of Classification Search .................. 455/558, 455/554.2, 557, 556.1, 575.1; 235/380, 441, 235/492; 710/301
See application file for complete search history.

(56) References Cited

U.S. PATENT DOCUMENTS

| 6,141,564 | A | 10/2000 | Bruner et al. |
| 6,390,374 | B1 * | 5/2002 | Carper et al. .................. 235/492 |
| 6,425,522 | B1 * | 7/2002 | Matsumoto et al. .......... 235/380 |
| 6,728,553 | B1 * | 4/2004 | Lehmus et al. ................ 455/558 |
| 2006/0208066 | A1 * | 9/2006 | Finn et al. ...................... 235/380 |
| 2010/0177769 | A1 * | 7/2010 | Barriga et al. ................. 370/352 |
| 2011/0252172 | A1 * | 10/2011 | Sun et al. ....................... 710/305 |

FOREIGN PATENT DOCUMENTS

| EP | 0 869 692 A1 | 10/1998 |
| JP | 2005-531203 | 10/2005 |
| KR | 10-2006-0073200 A | 6/2006 |
| WO | 98/33343 A1 | 7/1998 |

OTHER PUBLICATIONS

Husemann, Standards in the smart card world, Computer Networks, 2001, vol. 36, pp. 473-487.

* cited by examiner

*Primary Examiner* — Shaima Q Aminzay
(74) *Attorney, Agent, or Firm* — Jefferson IP Law, LLP (57) ABSTRACT

A device and method for operating a Universal Integrated Circuit Card (UICC) are provided. The method includes selecting a first data type based application by a mobile terminal, and transceiving data by converting data transceived between the first data type based application and a first application module into data of a second data type set in the UICC, while the mobile terminal communicates with the UICC storing the first application module for supporting the first data type based.

20 Claims, 4 Drawing Sheets

OPERATING DEVICE AND METHOD FOR UNIVERSAL IC CARD

PRIORITY

This application claims the benefit under 35 U.S.C. §119(a) of a Korean patent application filed in the Korean Intellectual Property Office on May 21, 2008 and assigned Serial No. 10-2008-0047190, the entire disclosure of which is hereby incorporated by reference.

BACKGROUND OF THE INVENTION

1. Field of the Invention

The present invention relates to a device and method for operating a Universal Integrated Circuit Card (UICC). More particularly, the present invention relates to a device and method for supporting a mobile terminal that independently or compositely accesses modules included in the UICC regardless of a communications mode.

2. Description of the Related Art

A Universal Integrated Circuit Card (UICC) is a chip card including a module for supporting various services of a mobile terminal. A UICC may be used for a mobile device on a Global System For Mobile Telecommunications (GSM) network and a Universal Mobile Telecommunication System (UMTS) network.

The UICC provides security and maintenance for various personal data in the mobile terminal and has storage capacity of several hundred kilo bytes. Based on additional services of the UICC, the storage capacity of the UICC can be expanded. The UICC includes a Subscriber Identity Module (SIM) in the GSM mode, while having a Universal SIM (USIM) in the UMTS mode. The UICC can include some applications and provide storage for telephone numbers or other applications.

The conventional UICC supports a connection to the GSM network by using a SIM application, while supporting the connection to the UMTS network by using a USIM application. A smart card for the UICC may include a Central Processing Unit (CPU), a Read Only Memory (ROM), a Random Access Memory (RAM), an Electrically Erasable Programmable Read Only Memory (EEPROM) and an Input/Output (I/O) circuit. Since the card slot is standardized, a subscriber can easily extract a personal account on the UICC and his own telephone number to transfer to other mobile devices. A telephone directory or a text message can also be transferred.

The conventional UICC has limitations in using services, which are used based on a corresponding network, of various stored application programs, such as, the service of using a transportation card a Digital Rights Management (DRM) and the service of downloading contents. That is, when a specific communications mode is used for a specific module among various application modules stored in the UICC, it is impossible to operate an application module having an interface that is not compatible with the specific communications mode. Accordingly, it is impossible for the conventional UICC to support various services.

In other words, when the conventional UICC is mounted with the SIM/USIM module used in connection with the GSM and UMTS communications network, it is impossible to access another service module for utilizing a specific service module. Accordingly, the use of various application services mounted in the UICC are restricted. Since voice service (telephone) is a basic service in a mobile communications terminal, other services cannot be accessed when utilizing the voice service.

Therefore, a need exists for a device and method for providing an interface for accessing modules in a UICC of a mobile terminal.

SUMMARY OF THE INVENTION

An aspect of the present invention is to address at least the above-mentioned problems and/or disadvantages and to provide at least the advantages described below. Accordingly, an aspect of the present invention is to provide a device and method for supporting a standard interface for independently or compositely accessing modules included in the UICC regardless of a communications mode.

In accordance with an aspect of the present invention, a Universal Integrated Circuit Card (UICC) operating device is provided. The device includes a UICC including a plurality of application modules, a mobile terminal that selects a first data type based application, communicates with the UICC storing a first application module for supporting the first data type based application among the plurality of application modules, and controls to convert data transceived between the first data type based application and the first application module into data of a second data type which is set in the UICC and to transceive.

In accordance with another aspect of the present invention, a method for operating a UICC including a plurality of application modules by a mobile terminal is provided. The method includes selecting a first data type based application by the mobile terminal, transceiving data by converting data transceived between the first data type based application and a first application module into data of a second data type set in the UICC, while the mobile terminal communicates with the UICC storing the first application module for supporting the first data type based application.

According to the UICC operating device and method of an exemplary embodiment of the present invention, various application modules that a user wants to use may be activated faster and more easily facilitated, regardless of the kind of application modules stored in the UICC, and the duplication activation among the application modules is supported such that more services can be used.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An exemplary Universal Integrated Circuit Card (UICC) operating device and method of the present invention relate to a UICC for changing a corresponding data type of application modules stored in the UICC to be compatible with application modules using a data type different from the data type used in the application operation of a mobile terminal and for distributing data transmitted to the application modules. Accordingly, the application modules stored in the UICC are activated independently or compositely. A specific operating module which may be stored in the UICC of the present invention is described as a Digital Rights Management (DRM) operating module. However, the invention is not restricted thereto. For example, the DRM operating module may be replaced with another operating module, such as a java script application, and with other various types of application modules.

Figure 1:
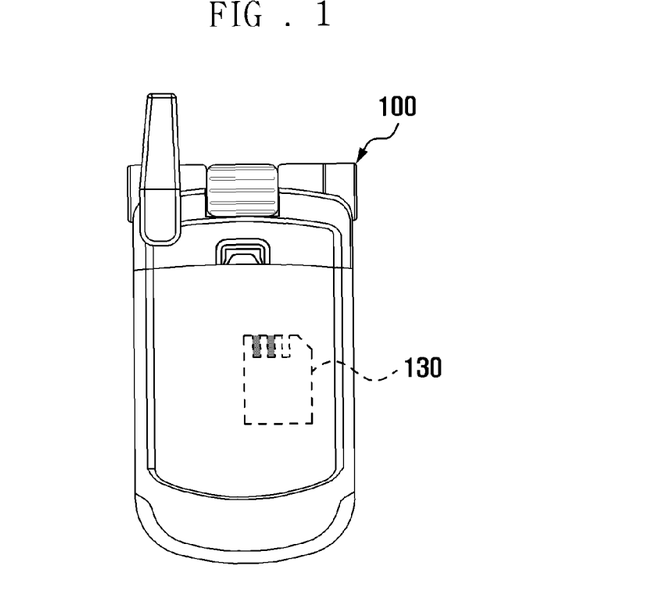
FIG. 1 is a diagram illustrating an exemplary shape of a Universal Integrated Circuit Card (UICC) operating device according to an exemplary embodiment of the present invention.

FIG. 1 is a diagram schematically illustrating an exemplary shape of a mobile terminal including a UICC according to an exemplary embodiment of the present invention.

Referring to FIG. 1, a UICC operating device includes a mobile terminal 100 and a UICC 130 mounted on the mobile terminal 100. The UICC operating device includes a slot capable of mounting the UICC 130 in a certain region of the mobile terminal 100. If the UICC 130 is mounted, electric power of the mobile terminal 100 is supplied to the UICC 130 to operate the UICC 130. If the electric power supply is provided after the UICC 130 is mounted, the mobile terminal 100 performs an Operating System (OS) booting process and selects and activates the application modules stored in the UICC 130 according to a preset setting mode.

For example, a Wireless Code Division Multiple Access (WCDMA) module, which is a first data type based application, and a Wireless Broadband (WiBro) module, which is a second data type based application, exist in the UICC 130. If the WCDMA module is set as a default mode, the mobile terminal 100 may activate the WCDMA module stored in the UICC 130, after the booting is completed. The mobile terminal 100 stores an application for the WCDMA module stored in the UICC 130, such as, a Subscriber Identity Module (SIM) application of the first data type. Thereafter, the mobile terminal 100 loads the SIM application under control of a controller and activates the WCDMA module of the UICC 130.

In the meantime, the mobile terminal 100 stores a corresponding application to activate the second data type based application WiBro module stored in the UICC. Thereafter, the mobile terminal 100 activates the WiBro module to operate a corresponding application according to an input of a user. Accordingly, the mobile terminal 100 may support activation of the WiBro module, while maintaining the activation of the WCDMA module.

Figure 2:
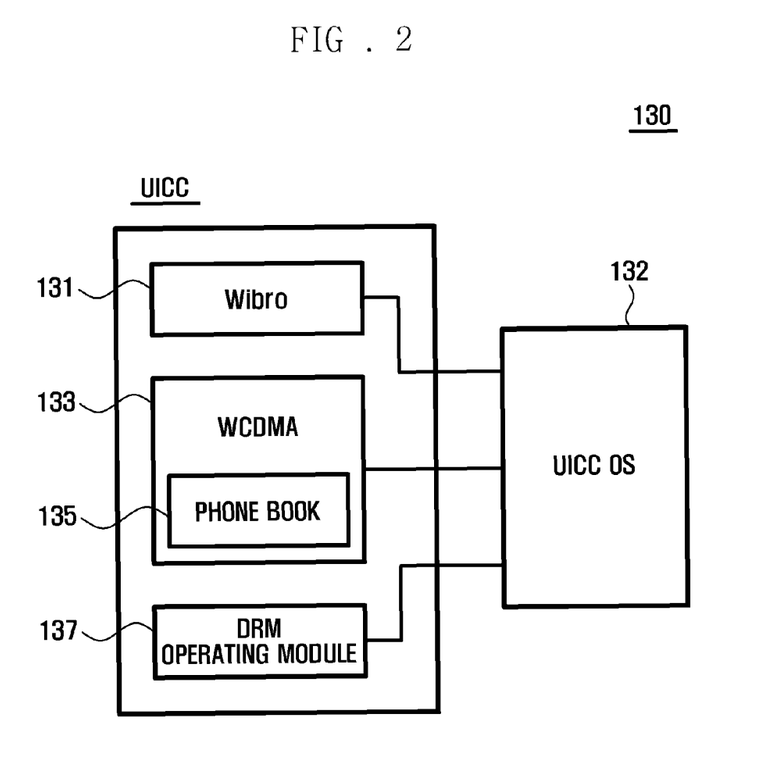
FIG. 2 is a block diagram schematically illustrating a UICC configuration according to an exemplary embodiment of the present invention.

Referring to FIG. 2, the UICC 130 stores a WiBro module 131, a WCDMA module 133, a phone book module 135 which may be included in the WCDMA module 133, a Digital Rights Management (DRM) operating module 137 and a UICC OS 132 for controlling activation of each module. In the UICC 130, if the UICC OS 132 receives a signal for activating each module from the mobile terminal 100, the UICC OS 132 designates an application module that the mobile terminal 100 selects, so that a communications channel between the mobile terminal 100 and the selected application module is formed.

The UICC OS 132 communicates with a card driver of the mobile terminal 100 and transmits a signal from the mobile terminal 100 to each module. More particularly, the UICC OS 132 transceives data of an Application Protocol Data Unit (APDU) type with a card driver of the mobile terminal 100. Based on the transceived data, the UICC OS 132 selects an application module that the mobile terminal 100 selects and activates the application module. The UICC OS 132 also provides a data communications path with the mobile terminal 100. Moreover, in the UICC OS 132, if the mobile terminal 100 selects and uses a plurality of application modules, a channel coding of transceived data is performed. For example, the WCDMA module 133 is assigned to a zero (0) channel and the WiBro module 131 is assigned to a first (1) channel. Thereafter, the data transceived according to a channel is controlled such that a plurality of application modules may be supported.

The mobile terminal 100 includes configurations for simultaneously or independently operating various application modules stored in the UICC 130. That is, the mobile terminal 100 may perform internet web surfing based on the WiBro module 131, while performing voice communications based on the WCDMA module 133 stored in the UICC 130. Moreover, the mobile terminal 100 may support the DRM operating module 137 stored in the UICC 130 to be independently available regardless of the operation of other application modules, such as, the WCDMA module 133 or the WiBro module 131.

Figure 3:
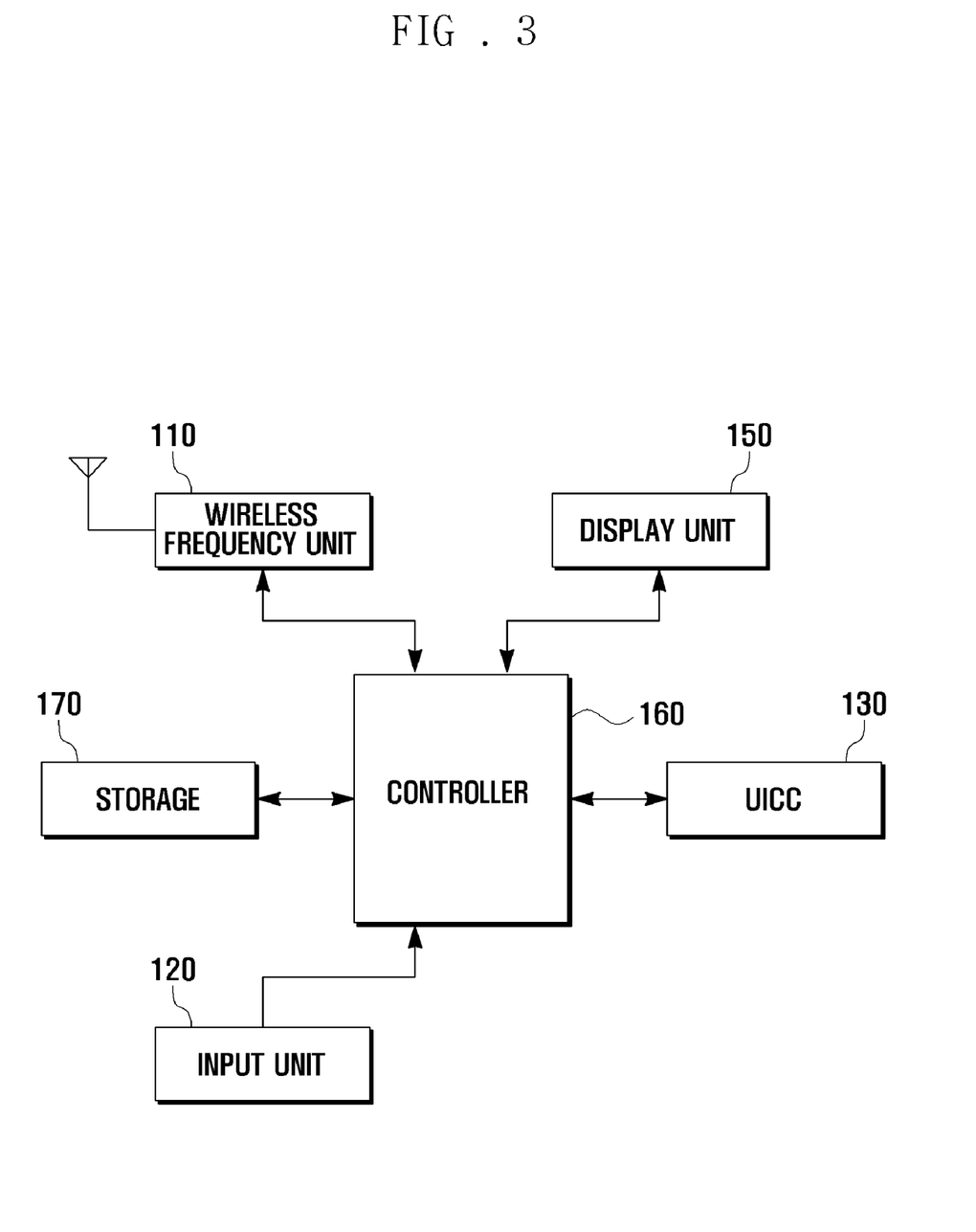
FIG. 3 is a block diagram schematically illustrating a configuration of a mobile terminal mounting a UICC according to an exemplary embodiment of the present invention.

FIG. 3 is a diagram schematically illustrating a configuration of a mobile terminal according to an exemplary embodiment of the present invention.

Referring to FIG. 3, the mobile terminal 100 includes a wireless frequency unit 110, an input unit 120, a UICC 130, a display unit 150, a controller 160 and a storage 170. The mobile terminal 100 performs a booting process based on an OS stored in the storage 170, activates various application modules stored in the UICC 130 according to an input signal from the input unit 120 and outputs through the display unit 150 an interface, which is necessary in the operation of a specific module stored in the UICC 130.

The wireless frequency unit 110 forms a communications channel for voice communications and a communications channel for data transmission, such as an image transmission, under the control of the controller 160. That is, the wireless frequency unit 110 forms a voice phone channel, a data communications channel and a video phone channel between mobile communications systems. The wireless frequency unit 110 includes a wireless frequency transmitter which up-converts and amplifies the frequency of a transmitted signal. The wireless frequency unit 110 also includes a wireless frequency receiving unit which low noise-amplifies a received signal and down-converts the frequency.

More particularly, the wireless frequency unit 110 may manage the signal transceived with the mobile communications systems based on the application module, which is selected in the input unit 120 among application modules stored in the UICC 130 and is activated. For example, when the WCDMA module 133 stored in the UICC 130 is activated, the wireless frequency unit 110 forms the voice phone channel or the video phone channel based on the WCDMA module 133, and transceives a necessary signal with the mobile communications systems under the control of the controller 160. Similarly, when the WiBro module 131 stored in the UICC 130 is activated, the wireless frequency unit 110 transceives the signal corresponding to the WiBro module 131 with a specific server according to the application of the application program through the mobile communications systems.

Still referring to FIG. 3, the input unit 120 includes a plurality of input keys (not illustrated) and function keys (not illustrated) for receiving number or character information from a user and setting various functions. The function keys include a direction key, a side key and a shortcut key which are set to perform a specific application. Moreover, the input unit 120 generates a key signal relating to a user setting and function control of the mobile terminal to transmit to the controller 160.

More particularly, the input unit 120 generates a signal for selecting one of the application modules stored in the UICC 130, according to the user input, to transmit to the controller 160. Moreover, the input unit 120 may generate an input signal for supporting various services according to the application module, after each application module is activated. For example, if the WCDMA module 133 is activated and the mobile terminal performs a voice communication based on the activation of the WCDMA module 133, the input unit 120 generates an input signal of a counterpart phone number according to the user input and transmits the input signal to the controller 160. Moreover, if the WiBro module 131 is activated and an internet search is performed based on the activation of the WiBro module 131, the input unit 120 generates an input signal for selecting a web browser, an input signal for selecting a specific link list of a received web page and an input signal corresponding to a word for search. The input unit transmits the input signals to the controller 160.

The display unit 150 displays information which a user input or information provided to the user with various menus of the mobile terminal 100. That is, the display unit 150 may provide various screens according to usage of the mobile terminal 100. For example, the various screens may include a stand-by screen, a menu screen, a message writing screen, a call screen and the like. The display unit 150 may be formed with a Liquid Crystal Display (LCD). When the LCD is formed in a touch screen, the display unit 150 may be included in an input means.

More particularly, the display unit 150 may provide a corresponding menu screen for supporting various services which may be operated based on various application modules stored in the UICC 130. That is, when the WiBro module 131, the WCDMA module 133, the phone book module 135 included in the WCDMA 133 module and the DRM operating module 137 are included in the UICC 130 module, the display unit 150 may provide a web browser selection screen based on the WiBro module 131, a voice phone channel selection screen based on the WCDMA module 133, a phone book display screen based on the phone book module 135 and a service display screen based on the DRM operating module 137 which may be provided based on a corresponding application module.

Here, each display screen provided by the display unit 150 may become a screen displayed in a state where the mobile terminal 100 provides an application operated based on a corresponding application module. For example, after the UICC 130 is mounted on the slot of the mobile terminal 100, when the WCDMA 133 module is set as a default in the booting process, the screen that the display unit 150 displays may become a call stand-by screen according to the activation of the WCDMA 133. If a request for operating the phone book module 135 stored in the WCDMA 133 is generated, the display unit 150 may display phone book data stored in the phone book module 135.

After the web browser is stored in the storage 170 of the mobile terminal 100, the web browser may be activated with a user selection. At this time, the web browser may perform web surfing, such as an internet search, based on the WiBro module 131 stored in the UICC 130. Accordingly, the display unit 150 may provide a menu screen for selecting the application module stored in the UICC 130, such as a WiBro module 131 and a WCDMA module 133 in the web browser operation. In the meantime, when the DRM operating module 137 stored in the UICC 130 is an application activated in the UICC 130, the display unit 150 receives and outputs an image according to the operation of a corresponding DRM operating module 137 through the controller 160.

Still referring to FIG. 3, the storage 170 stores the application for operating various application modules stored in the UICC 130 and stores the application necessary for a function motion of the mobile terminal 100. The storage 170 may include a program area and a data area. The program area stores an OS for booting the mobile terminal 100 and stores other options function, such as, an application program necessary for a sound replay function and an image function or a moving picture replay function. When the mobile terminal 100 activates each options function in response to the user request, the mobile terminal 100 provides each function by using corresponding applications under the control of the controller 160.

More particularly, the program area stores the application for operating various application modules stored in the UICC 130. For example, the program area may store a SIM application, which is an application of a first data type, for forming a voice phone channel based on the WCDMA module 133, a web browser, which is an application of a second data type for operating the WiBro module 131, and a message writing application, which is an application of a third data type that can be operated based on the phone book module 135.

Moreover, the program area may include configurations, such as a smart card resource manager, a light PC/SC driver, a SIM application, a SIM manager and a SIM card driver that the operating system provides to operate various application modules stored in the UICC 130. Each configuration is loaded in the controller 160 so the mobile terminal 100 recognizes the UICC 130 and activates application modules stored in the UICC 130. Each configuration will be described later with reference to FIG. 4.

The data area is an area in which data generated according to the use of the mobile terminal 100 is stored. The data area may store user data relating to various options functions, such as, a photographed image or a moving picture by a camera function, If the mobile terminal includes a camera function, phone book data transmitted from the phone book module 135, audio data, contents according to the web browser activation operated based on the WiBro module 131 or information corresponding to the user data.

The controller 160 controls a signal flow between the various options functions and provides a control signal so that each configuration may perform a necessary operation for the mobile terminal 100. The controller 160 confirms whether the UICC 130 is mounted in the slot during the booting process of the mobile terminal 100. The controller 160 may complete the booting process by utilizing a corresponding application module, when the UICC 130 is mounted, and utilizing an application module necessary for the booting process among the application modules stored in the UICC 130.

For example, according to a setting of the mobile terminal 100, the controller 160 may maintain a standby state to use a call function by activating the WCDMA module 133 stored in the UICC 130. Moreover, if the phone book module 135 is stored in the WCDMA 133 module of the UICC 130, the controller 160 may copy phone book data stored in the phone book module 135 into the storage 170 of the mobile terminal 100, during the OS booting process of the mobile terminal 100. The controller 160 controls a signal flow to support a corresponding service by activating the WiBro module 131 or the DRM operating module 137 stored in the UICC 130 according to the input signal of the input unit 120. The role of the controller 160 will be described with reference to FIG. 4.

Figure 4:
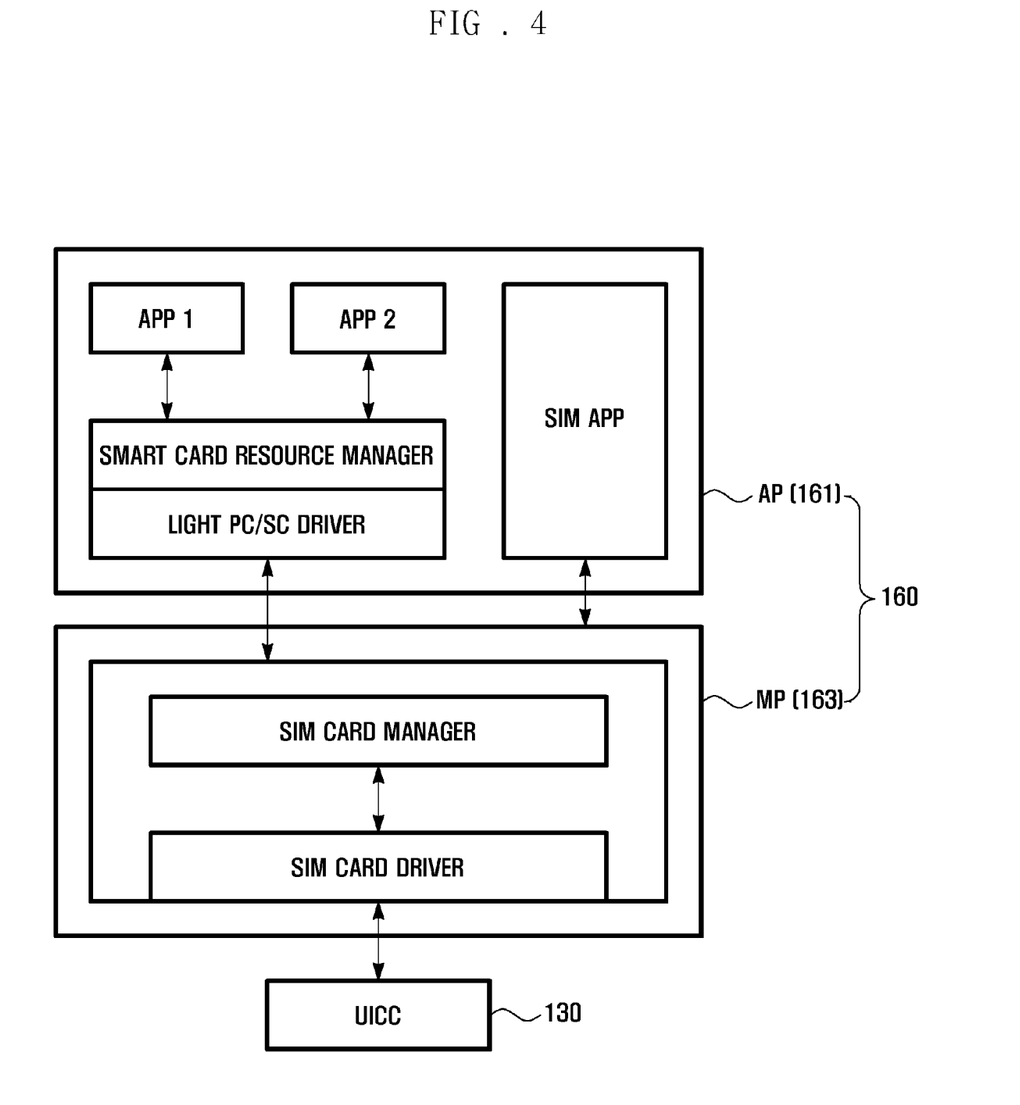
FIG. 4 is a block diagram illustrating a configuration of a controller in a mobile terminal according to an exemplary embodiment of the present invention.

FIG. 4 is a diagram illustrating a configuration of a controller according to an exemplary embodiment of the present invention.

Referring to FIG. 4, the controller 160 of the mobile terminal 100 includes an application processor 161 and a modem processor 163. Here, the controller 160 is classified into the application processor 161 and the modem processor 163 to clarify characteristics of the mobile terminal. However, the present invention is not restricted thereto. When the application processor 161 and the modem processor 163 are implemented with one-chip, the controller 160 of the mobile terminal operates as one controller 160.

In the controller 160, the application processor 161 controls an application operation and communicates with the UICC 130 through the modem processor 163. Thus, the modem processor 163 communicates with various application modules of the UICC 130 having different characteristics to receive data. The modem processor 163 transmits received data to the application processor 161 to perform a corresponding application operation. The modem processor 163 transceives data, for example, the APDU type data with the UICC 130 to support communications. The modem processor 163 communicates with the application processor 161 with a data type, such as the APDU type or a command type, which is set according to a corresponding application.

Still referring to FIG. 4, the application processor 161 includes a SIM Application (SIM APP) of a first data type, a first Application (APP1) of a second data type, a second Application (APP2) and a light Personal Computer/Smart Card (PC/SC) driver. The application processor 161 may also use a smart card resource manager function that the operating system provides. The first Application (APP1) and the second Application (APP2) illustrate that a plurality of PC/SC based applications may be operated, while a single application may be operated. The SIM Application (SIM APP) is a SIM access phone application program depending on a platform Application Program Interface (API) that may be operated based on the WCDMA module 133 stored in the UICC 130. For example, the SIM Application (SIM APP) may be an application for voice communication operated based on the WCDMA module 133, an application for video phone communications and a message transmit application.

The SIM Application (SIM APP) communicates with the UICC 130 through a SIM manager and SIM card driver operated based on the WCDMA module 133. At this time, the SIM Application (SIM APP) transmits data of the command type to the SIM manager and SIM card driver to be operated based on the WCDMA module 133. The command type data is converted into an APDU type data by the SIM manager and the APDU type data is transmitted to the UICC 130 via the SIM card driver. Similarly, data that the UICC 130 transmits to the SIM Application (SIM APP), which is the APDU type data, is transmitted to the SIM manager via the SIM card driver. The SIM manager converts the APDU type data into a command type data and transmits the command type data to the SIM Application (SIM APP).

The first Application (APP1) and the second Application APP2 may be a UICC application module that is prepared by using a smart card API, or may be an application program operated based on the WiBro module 131 which is a second data type application, such as, a PC/SC based UICC access application. For example, the first Application (APP1) and the second Application (APP2) may be a web browser operated based on the WiBro module 131 and may be various applications, which are connected to a web server based on the web browser. Moreover, the first Application (APP1) and the second Application (APP2) are applications operated based on the smart card resource manager function that the operating system provides. The first Application (APP1) and the second Application (APP2) communicate with the UICC 130 through the smart card resource manager function that the operating system provides, the light PC/SC driver, the SIM manager and the SIM card driver, to be operated based on the WiBro module 131.

Accordingly, the first Application (APP1) and the second Application (APP2) transmit data to the smart card resource manager of the OS with a packet type, for example, the APDU type. The packet data of the APDU type is transmitted to the UICC 130 without a conversion of data through the light PC/SC driver, the SIM manager and the SIM card driver. The smart card resource manager function is logically positioned in a lower layer of the first Application (APP1) and the second Application (APP2). The smart card resource manager controls transceived data of the first Application (APP1) and the second Application (APP2), while managing the resource allocation and the resource collection according to the operation of the first Application (APP1) and the second Application (APP2).

That is, the smart card resource manager allocates a resource necessary for using the first Application (APP1), if the first Application (APP1) is selected by the input unit 120 and activated, while performing a resource allocation for the activation of a corresponding application, if the second Application APP2 is selected and activated. If the first Application (APP1) or the second Application (APP2) is terminated, the smart card resource manager collects an assigned resource. The smart card resource manager transmits data used in the operation of the first Application (APP1) and the second Application (APP2) to the light PC/SC driver, while transmitting data received from the light PC/SC driver to a corresponding application.

The smart card resource manager is a function that the OS substantially provides for managing the smart card. The smart card resource manager provides a library for supporting a PC/SC, which is a UICC access standard interface for efficiently and adaptively providing the operation of an entire program based on situations in which the first Application (APP1) and the second Application (APP2) may approach, at the same time, the UICC 130. The light PC/SC driver allows the smart card resource manager to interface with the UICC 130 in order to request necessary data or provide data to the UICC 130. The light PC/SC driver provides a client API to the smart card resource manager. Thereby, the light PC/SC driver provides various paths by which the first Application (APP1) and the second Application (APP2) may interface with the UICC 130 based on the smart card resource manager.

That is, the light PC/SC driver performs a pipe setting for the smart card resource manager for providing a smart card reader function and the APDU type data transmission to the UICC 130. In other words, the light PC/SC driver performs a cross linking role for connecting the smart card resource manager and the UICC 130. The modem processor 163 includes the SIM manager and the SIM card driver.

Still referring to FIG. 4, the SIM manager manages the SIM resource of the modem processor 163. The SIM manager communicates with the first Application (APP1) and the second Application (APP2) through the light PC/SC driver and smart card resource manager of the application processor 161, and directly communicates with the SIM application. The SIM manager receives the APDU type data from the light PC/SC driver and transmits the APDU type data to the UICC 130 through the SIM card driver. The SIM manager functions as an APDU data transmission path transmitting the APDU type data received from the UICC 130 and the SIM card driver to the light PC/SC driver. In the meantime, the SIM manager receives command type data which is transmitted to the SIM application and converts the command type data into corresponding APDU type data, and transmits the APDU type data to the UICC 130 via the SIM card driver. The SIM manager converts the APDU type data transmitted from the UICC 130 and the SIM card driver into corresponding command data and transmits the corresponding command data to the SIM Application (SIM APP). In other words, the SIM manager functions as a data transmission path for the operation of the PC/SC based application, and converts and transmits data for the operation of the modem based application.

The SIM card driver is positioned between the SIM manager and the UICC 130, and transmits the APDU type data transmitted from the SIM manager to the UICC 130. The SIM card driver also transmits the APDU type data transmitted from the UICC 130 to the SIM manager. That is, the SIM card driver provides an interface for communicating with the UICC 130. Moreover, the SIM card driver performs a hardware control of the UICC 130, that is, the UICC power supply and cut off and the UICC 130 reset control function.

As describe above, the controller 160, according to an exemplary embodiment of the present invention, provides an application layer in which an application is operated, a modem layer that performs transmission or conversion of data according to the application operation and the transmission, and a UICC layer that provides a module for supporting the application operation. Thereby, various application modules stored in the UICC are independently or simultaneously performed. The number of UICC application modules increases as the storage capacity of UICC increases. Accordingly, the UICC of the present invention may support application modules of various types stored in the UICC to be applicable through the update of a driver of the modem processor 163 and an extension of program of the application processor 161, regardless of characteristics of the mobile terminal 100.

The mobile terminal 100 and the UICC operating device including the UICC 130 mounted on the mobile terminal 100 were described above. Hereinafter, an exemplary operating method of the UICC operating device is described below.

Figure 5:
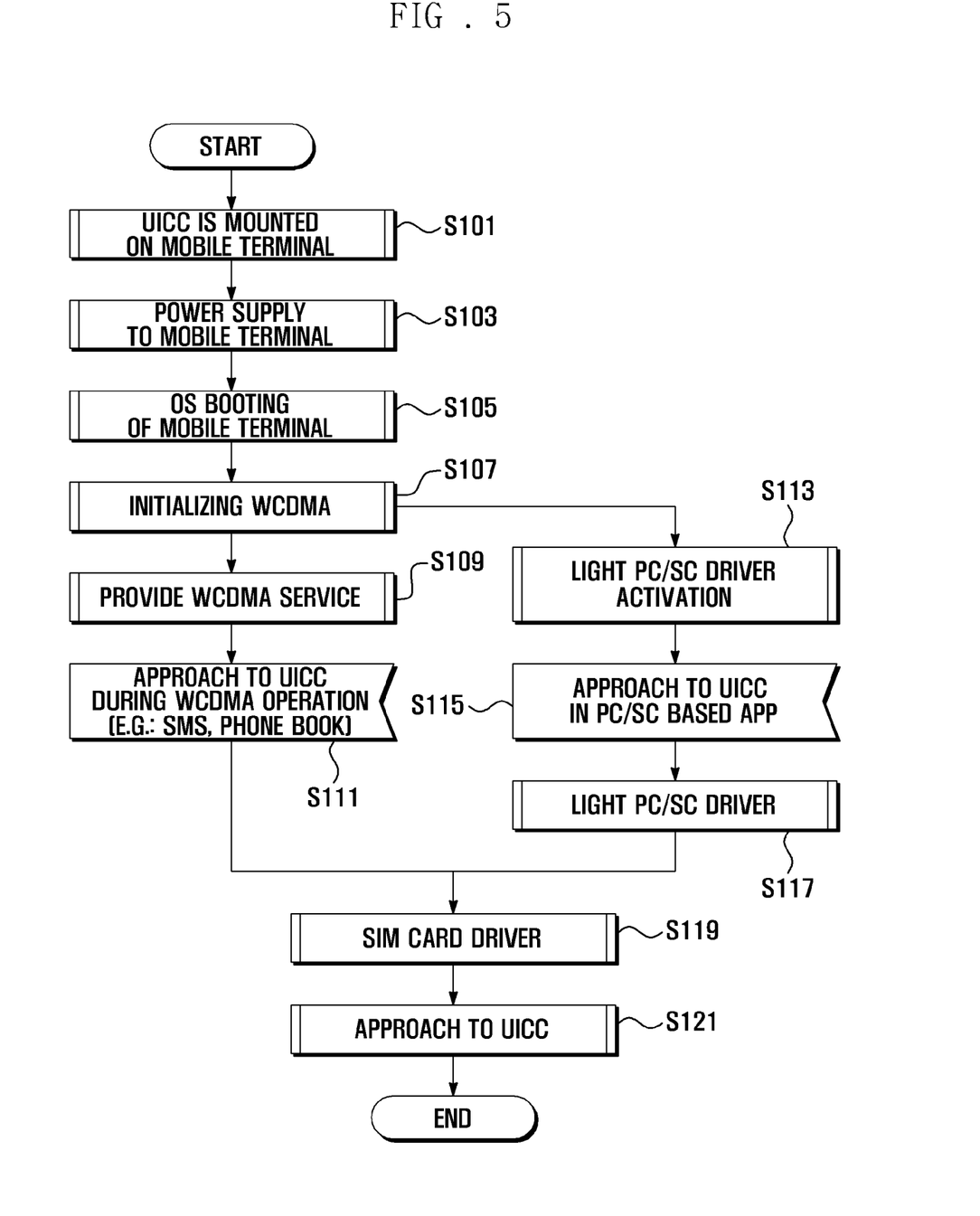
FIG. 5 is a diagram illustrating an operating method of a UICC operating device according to an exemplary embodiment of the present invention.

FIG. 5 is a flowchart illustrating an operating method of a UICC operating device according to an exemplary embodiment of the present invention.

Referring to FIG. 5, in the UICC operating method, the UICC is mounted on the mobile terminal in step S101. The mobile terminal prepares a UICC mounting slot, while the UICC is inserted into the slot of the mobile terminal. At this time, the UICC includes a power line formed in the UICC mounting slot and a connection line connected to a signal line. The UICC is connected to each line formed in the UICC mounting slot.

After the UICC is mounted on the mobile terminal, when power is supplied to the mobile terminal in step S103, the OS booting process of the mobile terminal is performed in step S105. That is, if a user transmits an input signal indicating a power supply to the controller of the mobile terminal by using a specific key-button of the input unit, the controller receives power from a power supply unit, such as a battery, and loads the OS stored in the storage. In an exemplary implementation, the controller supplies the power to the UICC and initializes the UICC. The controller is able to read at least one application module among the application modules stored in the UICC according to a preset schedule.

That is, when a specific communications module, for example, the WCDMA module is stored in the UICC and the WCDMA module is scheduled to be activated in a default mode, the controller initializes the WCDMA module according to a preset schedule in step S107. The controller may have a standby state to provide a service, such as, a voice phone service or a video phone service that the WCDMA may provide by using the initialized WCDMA module in step S109.

The controller may interface with the UICC according to a service selection of a user, such as, a message service selection or a phone book use service in step S111. The WCDMA module based service may operate a command based SIM application. Here, in the command based SIM application, data communications for operating the WCDMA module are performed based on a command. When a call function setting exists among basic functions of the mobile terminal, the WCDMA module may be activated for receiving a stand-by.

In other words, if the mobile terminal is a mobile communications terminal, a call function may be scheduled to be set as a default mode. Accordingly, when the booting process of the OS is completed, the WCDMA module stored in the UICC may be activated for supporting the call function. At this time, the controller reads the SIM application, which is an application required for the activation of the WCDMA module from the storage to activate the SIM application, while activating the WCDMA module for the operation of the SIM application.

In an exemplary embodiment of the present invention, the WCDMA module is activated for setting the call function. The WCDMA module may be replaced with other modules, that is, various communications modules for supporting the call function, such as, the CDMA module and the GSM module. In step S111, the SIM application transmits command type data to the UICC. When data is set in such a manner that the UICC transceives APDU type data, the SIM manager arranged in the modem processor converts data of the command type into the APDU type. The SIM manager transmits the APDU type data to the UICC through the SIM card driver and converts the APDU type data transmitted from the UICC into a command type data to transmit to the SIM application. Accordingly, the SIM application may be compatible with an application module stored in the UICC to operate.

When the SIM application operation for supporting the call function and the command based communications execution for initializing the WCDMA module are completed in step S107, the light PC/SC driver is activated in step S113. That is, when the call function is activated, the controller activates the light PC/SC driver to prepare the PC/SC based application operation request, which is another user service request.

After the light PC/SC driver activation is completed in step S113, if the PC/SC based application operation request is generated such that the mobile terminal interfaces with the UICC in step S115, the controller activates the smart card resource manager function and logically arranges the PC/SC based application on the upper layer of the smart card resource manager and arranges the light PC/SC driver on the lower layer of the smart card resource manager to interface with the UICC according to the PC/SC based application operation in step S117.

The smart card resource manager provided from the operating system provides a library for supporting the PC/SC. Based on the library for supporting the PC/SC, the light PC/SC driver transmits data from the PC/SC based application, such as the APDU type data, to the modem processor in step S119. The light PC/SC driver manages data transceived with the UICC and may not perform a hardware dependent maintenance of the UICC, that is, a power on/off, an initialization and a reset.

The APDU type data transmitted from the PC/SC based application, which is based on the WCDMA module, is transmitted to the SIM manager through the smart card resource manager and the light PC/SC driver. Consequently, the controller connects the light PC/SC driver to the SIM card driver through the SIM manager. At this time, the SIM manager transmits the APDU type data transmitted from the PC/SC based application to the UICC through the SIM card driver in step S121. The UICC is set to process the APDU type data. Therefore, the APDU type data received from the SIM card driver is immediately processed and may be transmitted to a corresponding application module in step S123. That is, the controller interfaces with the UICC through a data type conversion.

The corresponding application module performs the operation according to the received APDU type data. The corresponding application module then transmits a response signal, obtained according to the operation, to the PC/SC application in reverse order through the UICC OS, the SIM card driver, the SIM manager, the light PC/SC driver and the smart card resource manager, such that the corresponding PC/SC application operation may be performed. In the meantime, when a plurality of application modules among the stored application modules, such as, the SIM application based WCDMA module and the WiBro module based on the PC/SC based application are simultaneously operated, the UICC OS may allocate a channel and may enable data communications by channel, or may receive a corresponding signal in time allocated to a corresponding module by time dividing a transceived signal.

Moreover, the UICC OS may use the channel allocation method together with a time dividing method, while setting the time dividing method as a basic method. The UICC OS may also transmit data of another channel to a channel to which data is not transmitted and communicated.

As described above, the UICC operating device and method according to an exemplary embodiment of the present invention includes a configuration that converts a data type to activate a corresponding application module, with the UICC having an application module which does not perform communications with a data type that the mobile terminal supports. The UICC operating device and method may activate the application module and the application which is connected to the application module by using a corresponding configuration of the present invention. Accordingly, a device and method for operating various application modules may be provided.

In the meantime, in the UICC operating device and method, a call function is set as a main function. While the call function supporting module, such as the WCDMA module, is operated, another service function, such as the service supporting function support module including an internet search, for example, the WiBro module, is operated. However, the present invention is not restricted to the application module. Therefore, it should be understood that the UICC operating device and method of the present invention supports application modules having different communication modes among various application modules stored in the UICC by converting a data type to support a corresponding communications method. Moreover, the UICC operating device and method of the present invention support time-dividing data transceived of activated application modules, or support a method for channel dividing to simultaneously utilize the service provided by various application modules.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Universal Integrated Circuit Card (UICC) comprising a plurality of application modules by a mobile terminal, the method comprising:
   selecting a first data type based application by the mobile terminal; and
   transceiving data by converting data transceived between the first data type based application and a first application module into data of a second data type set in the UICC, while the mobile terminal communicates with the UICC storing the first application module for supporting the first data type based application.

2. The method of claim 1, wherein the transceiving of the data comprises:
   converting data of the first data type transmitted from the application of the first data type into data of the second data type;
   transmitting the data of the second data type to the UICC;
   converting the data of the second data type transmitted from the UICC into the data of the first data type; and
   transmitting the data of the first data type to the application of the first data type.

3. The method of claim 2, wherein the first data type comprises a command based data type and the second data type comprises an Application Protocol Data Unit (APDU) based data type.

4. The method of claim 2, wherein the first application module comprises one of a Wireless Code Division Multiple Access (WCDMA) module, a Code Division Multiple Access (CDMA) module and a Global System For Mobile Telecommunications GSM module.

5. The method of claim 1, further comprising:
selecting a second data type based application by the mobile terminal, when the first data type based application operates; and
communicating with the UICC storing a second application module for supporting the second data type based application with the data of the second data type by the mobile terminal.

6. The method of claim 5, wherein the second data type based application comprises a Personal Computer/Smart Card (PC/SC) based application.

7. The method of claim 6, wherein the application of the first data type based application comprises a command based application.

8. The method of claim 5, wherein the second application module comprises one of a Wireless Broadband (WiBro) module and a Digital Rights Management (DRM) operating module.

9. The method of claim 5, further comprising:
assigning a channel to the first application module and the second application module, respectively, by the UICC; and
distributing data transceived according to each channel to a corresponding application module by the UICC.

10. The method of claim 5, further comprising selecting and activating an application module corresponding to a selected application module in the mobile terminal.

11. A Universal Integrated Circuit Card (UICC) operating device, the device comprising:
a UICC comprising a plurality of application modules; and
a mobile terminal for selecting a first data type based application, for communicating with the UICC storing a first application module which supports the first data type based application among the plurality of application modules for converting data transceived between the first data type based application and the first application module into data of a second data type which is set in the UICC and for transceiving.

12. The device of claim 11, wherein the mobile terminal comprises:
an application processor for controlling an application operation of the first data type; and
a modem processor for converting data of the first data type transmitted from the application of the first data type into data of the second data type, for transmitting the data of the second data type to the UICC, for converting data of the second data type transmitted from the UICC into data of the first data type and for transmitting the data of the first data type to the application of the first data type.

13. The device of claim 12, wherein the first data type comprises a command based data type and the second data type comprises an Application Protocol Data Unit (APDU) based data type.

14. The device of claim 11, wherein, when the first data type based application is operated, if the mobile terminal selects a second data type based application, the mobile terminal controls data to communicate with the UICC storing a second application module for supporting the second data type based application among the plurality of application modules with data of the second data type.

15. The device of claim 14, wherein the second data type based application comprises a Personal Computer/Smart Card (PC/SC) based application.

16. The device of claim 15, wherein the first data type based application comprises a command based application.

17. The device of claim 14, wherein the first application module is one of a Wireless Code Division Multiple Access (WCDMA) module, a Code Division Multiple Access (CDMA) module and a Global System For Mobile Telecommunications GSM module.

18. The device of claim 14, wherein the second application module comprises one of a Wireless Broadband (WiBro) module and a Digital Rights Management (DRM) operating module.

19. The device of claim 14, wherein the UICC further comprises a UICC Operation System OS for assigning a channel to the first application module and the second application module, respectively, and for distributing transceived data, according to each channel, to a corresponding application module.

20. The device of claim 19, wherein the UICC OS selects and activates an application module corresponding to the application module selected in the mobile terminal.

* * * * *